United States Patent
Miles et al.

(10) Patent No.: US 12,322,075 B2
(45) Date of Patent: Jun. 3, 2025

(54) DEVICE, METHOD AND SYSTEM FOR IDENTIFYING OBJECTS IN WARPED IMAGES FROM A FISHEYE CAMERA

(71) Applicant: MOTOROLA SOLUTIONS, INC., Chicago, IL (US)

(72) Inventors: Brandon Miles, Vancouver (CA); Aral Sarrafi, Chicago, IL (US); Xiao Xiao, Chicago, IL (US); Aleksey Lipchin, Chicago, IL (US); Mitul Saha, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 318 days.

(21) Appl. No.: 17/168,701

(22) Filed: Feb. 5, 2021

(65) Prior Publication Data
US 2022/0253988 A1 Aug. 11, 2022

(51) Int. Cl.
*G06T 5/80* (2024.01)
*G06T 3/047* (2024.01)
*G06T 7/20* (2017.01)

(52) U.S. Cl.
CPC ............... *G06T 5/80* (2024.01); *G06T 3/047* (2024.01); *G06T 7/20* (2013.01); *G06T 2207/10016* (2013.01); *G06T 2207/30241* (2013.01)

(58) Field of Classification Search
CPC ........... G06T 2210/12; G06T 7/10–194; G06T 3/0018; G06T 2207/30242;
(Continued)

(56) References Cited

U.S. PATENT DOCUMENTS 6,924,832 B1 * 8/2005 Shiffer ............... G06T 7/248
    348/39
10,255,507 B2 * 4/2019 Taylor ................ G06T 3/00
(Continued)

FOREIGN PATENT DOCUMENTS

WO WO-2020018585 A1 1/2020
WO WO-2020027778 A1 2/2020

OTHER PUBLICATIONS

O. Krams and N. Kiryati, "People detection in top-view fisheye imaging," in 2017 14th IEEE International Conference on Advanced Video and Signal Based Surveillance (AVSS), Lecce, Italy, 2017 pp. 1-6. (Year: 2017).*

(Continued)

*Primary Examiner* — Gandhi Thirugnanam
(74) *Attorney, Agent, or Firm* — PERRY + CURRIER INC.

(57) ABSTRACT

A device, method and system for identifying objects in warped images from a fisheye camera is provided. A device converts warped images from a fisheye camera into dewarped images. The device determines that a first object identified in the dewarped images is: entering a blind-spot region of the dewarped images; or located at a first edge region of the dewarped images. The device determines that a second object is: exiting the blind-spot region of the dewarped images, or located at a second edge region of the dewarped images, the second edge region opposite the first edge region. The device, in response to the second object meeting one or more reidentification conditions associated with the first object, reidentifies the second object as the first object at the dewarped images.

18 Claims, 7 Drawing Sheets

(58) Field of Classification Search
CPC ......... G06T 2207/30241; G06T 3/0093; G06T 5/006; G06T 3/0062; G06T 3/0012; G06T 7/30; G06T 2207/30196; G06T 2207/30; G06T 7/20; G06V 2201/07; G06V 10/25; G06V 20/52

See application file for complete search history.

(56) References Cited

U.S. PATENT DOCUMENTS

| | | | | |
|---|---|---|---|---|
| 10,460,459 | B2* | 10/2019 | Bar | G03B 35/10 |
| 10,733,705 | B2* | 8/2020 | Sakamoto | G06F 18/2185 |
| 2017/0177946 | A1* | 6/2017 | Citerin | G06V 40/173 |
| 2018/0253596 | A1* | 9/2018 | Barman | G06V 10/147 |
| 2018/0374200 | A1* | 12/2018 | Taoki | G06T 7/73 |
| 2019/0001299 | A1* | 1/2019 | Sturm | B01J 20/28042 |
| 2019/0019299 | A1* | 1/2019 | Bar | H04N 13/344 |
| 2019/0294889 | A1* | 9/2019 | Sriram | G06F 18/24143 |
| 2020/0098085 | A1* | 3/2020 | Blott | B64C 39/024 |
| 2020/0134306 | A1* | 4/2020 | Zhu | G06V 20/52 |
| 2020/0202177 | A1* | 6/2020 | Buibas | G06V 10/764 |
| 2021/0357639 | A1* | 11/2021 | Campbell | G06T 3/047 |
| 2022/0237731 | A1* | 7/2022 | Heo | G06T 3/0031 |
| 2022/0253988 | A1* | 8/2022 | Miles | G06T 3/0018 |

OTHER PUBLICATIONS

Bertozzi, Massimo, et al., "360° Detection and Tracking Algorithm of Both Pedestrian and Vehicle Using Fisheye Images", pp. 132-137, 2015 IEEE Intelligent Vehicles Symposium (IV), Jun. 28-Jul. 1, 2015, COEX, Seoul, Korea.

Jianhui, Wu, et al., "Study the Improved CAMSHIFT Algorithm to Detect the Moving Object in Fisheye Image", pp. 1017-1020, 2013 International Conference on Mechatronic Sciences, Electric Engineering and Computer (MEC), Dec. 20-22, 2013, Shenyang, China.

Krams, Oded, et al., "People Detection in Top-View Fisheye Imaging", 2017 IEEE.

Kubo, Yohei, et al., "Human Tracking Using Fisheye Images", pp. 2013-2017, SICE Annual Conference 2007, Set. 17-20, 2007, Kagawa University, Japan.

Saito, Mamoru, et al., "People Detection and Tracking from Fisheye Image Based on Probabilistic Appearance Model", pp. 435-440, SICE Annual Conference 2011, Sep. 13-18, 2011, Waseda University, Tokyo, Japan.

* cited by examiner

DEVICE, METHOD AND SYSTEM FOR IDENTIFYING OBJECTS IN WARPED IMAGES FROM A FISHEYE CAMERA

BACKGROUND OF THE INVENTION

Fisheye cameras may be installed at sites to detect and/or identify and/or track objects. However, fisheye cameras generally acquire warped images, while video analytics engines for detecting and/or identifying and/or tracking objects are generally trained on images from "regular" images, such as non-warped images from non-fisheye cameras, and the like.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Figure 1:
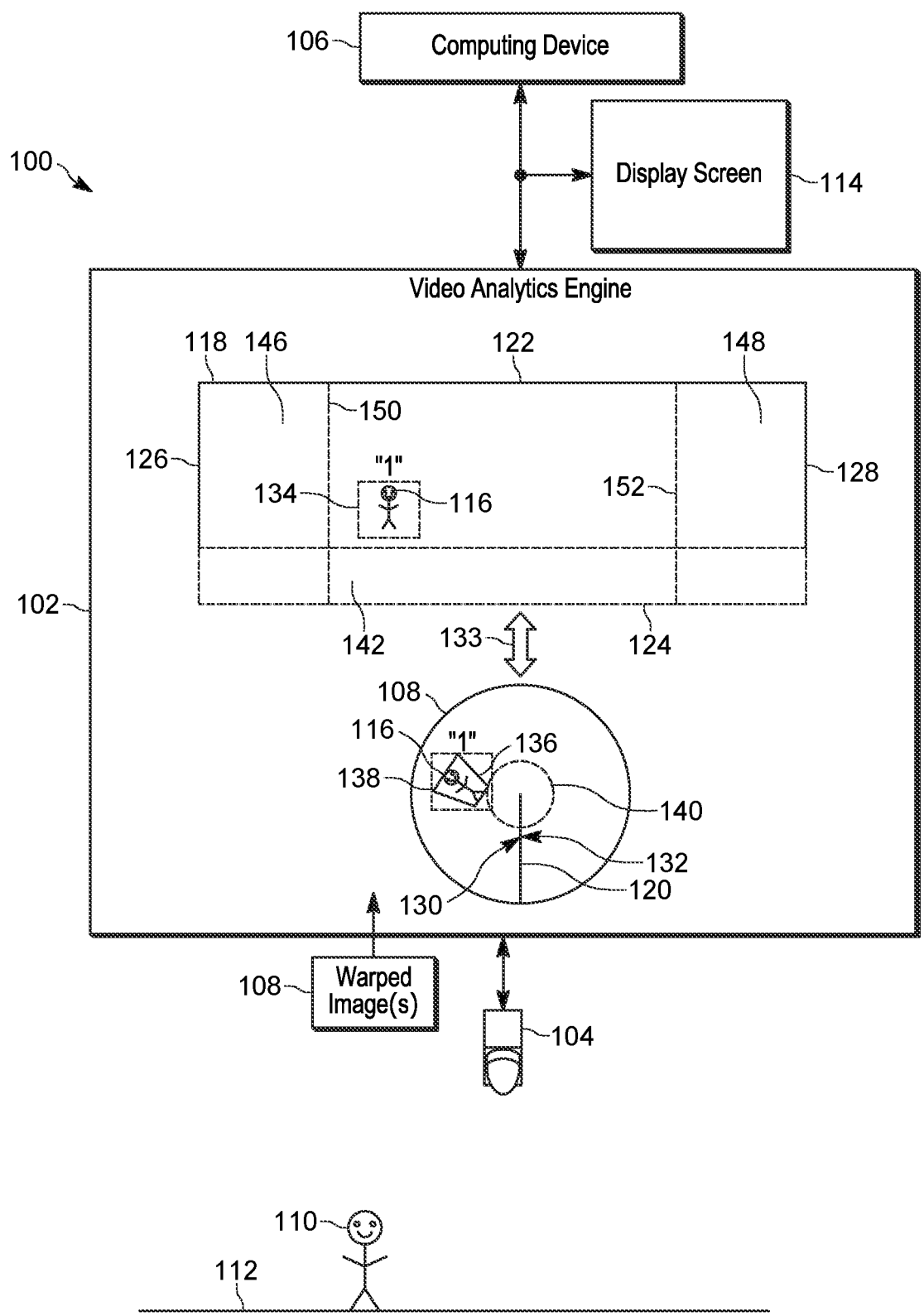
FIG. 1 is a system for identifying objects in warped images from a fisheye camera, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Fisheye cameras may be installed at sites to detect and/or identify and/or track objects (e.g., physical objects in a field-of-view of a fisheye camera). However, fisheye cameras generally acquire warped images, while video analytics engines for detecting and/or identifying and/or tracking objects are generally trained on images from "regular" images, such as non-warped images from non-fisheye cameras (e.g., perspective-based cameras and/or "regular" cameras), and the like. Furthermore, training video analytics to detect and/or identify and/or track objects based on warped images from fisheye cameras can be challenging. Conversely, a video analytics engine that can detect and/or identify and/or track objects for both warped images and non-warped images may be preferred so that the video analytics engine can process images from different camera types. Thus, there exists a need for an improved technical method, device, and system for identifying objects in warped images from a fisheye camera.

Hence, provided herein is a video analytics engine which receives warped images from a fisheye camera. The video analytics engines may comprise a combination of hardware and software which may be located at, or in, the fisheye camera and/or in another appliance and/or device which may be local to, or remote from (e.g., in the cloud), the fisheye camera. The video analytics engine may further be distributed among a plurality of components and the like. The video analytics engine may receive images from a plurality of cameras, including the fisheye camera, as well as other fisheye cameras and/or other cameras that are not fisheye cameras; in these examples, the video analytics engine may detect and/or identify and/or track objects in both warped and non-warped images. In particular, the video analytics engine may be trained to identify and track objects, such as persons, and/or any other suitable object, in non-warped images.

However, to identify and track objects in warped images from the fisheye camera, the video analytics engine is generally configured to convert warped images into dewarped images (e.g., similar to non-warped images) so that objects of the warped images may be identified in the dewarped images, and tracked accordingly. Hence, the video analytics engine provided herein is generally configured to track objects in both warped images (e.g., by converting to dewarped images) and non-warped images.

A dewarping process used by the video analytics engine may generally include "cutting" warped images, which may be generally circular, through a line that extends from the center of a warped images to an edge thereof, for example along a radius of a circular warped image, and "unfolding" the warped image along the line into a dewarped image. As such, coordinates of the warped and dewarped images that correspond to one another are generally known to the video analytics engine (e.g., pixels of the warped image and the dewarped image are generally mapped to each other by the video analytics engine). However, such a process introduces further challenges.

In one example, the dewarping process, described above, generally causes objects located at center region of the warped images to be heavily distorted and/or smeared across a corresponding region of the dewarped images, such as a bottom of the dewarped images. As such, objects in the portion of the dewarped images that correspond to the center region of the warped images may not be recognizable as an object to the video analytics engine trained to recognize objects in non-warped images due to heavy distortions caused by the dewarping process. Hence, an object that enters, and then exits, a center region of the warped images may "disappear" and then "reappear" at different locations in the dewarped images. Herein, the region of the dewarped images that corresponds to a center region of the warped images may be referred to as a blind-spot region as objects may not be identified in this blind-spot region.

In another example, the dewarping process, described above, generally causes opposite sides of the dewarped images to correspond to a same, or about the same, region of the warped images adjacent the line where the warped images were "cut", such that an object that moves, in the warped images, through the line, may disappear from one edge of the dewarped images and reappear at a second, opposite edge of the dewarped images, though the object may be partially located at both of the edges when located on the line in the warped images.

In each of these examples, the video analytics engine provided herein may initially identify a first object that is entering a blind-spot region of the dewarped images or is located at a first edge region of the dewarped images. The video analytics engine may further determine that a second object is exiting the blind-spot region of the dewarped images, or is located at a second edge region of the dewarped images. Such a second object may comprise the first object, or a different object. However, the video analytics engine may be provided with, and/or may determine, one or more reidentification conditions associated with the first object that enables the video analytics engine to determine whether the first and the second objects correspond to a same physical object or different physical objects.

Such one or more reidentification conditions may comprise an appearance of the second object being the same as, or similar to (e.g., with a threshold confidence value), the first object. However, such one or more reidentification conditions may be based on a velocity and/or trajectory of the first object and/or the second object; for example, as coordinates of the warped and dewarped images that correspond to one another are generally known, the video analytics engine may predict where and/or when the first object that disappears in the dewarped image is to reappear based on the trajectory, and the like, among other possibilities.

Similarly, the video analytics engine may label the first object and the second object with a same label and/or object identifier in one, or both, of the warped and dewarped images. Similarly, the video analytics engine may draw a bounding box around the object in the dewarped images and draw a corresponding bounding box around the object in the warped images, the corresponding bounding box of the warped images having the same, and/or similar, corresponding coordinates as the bounding box in the dewarped images.

An aspect of the present specification provides a method comprising: converting, at a video analytics engine, warped images from a fisheye camera into dewarped images; determining, at the video analytics engine, that a first object identified in the dewarped images is: entering a blind-spot region of the dewarped images; or located at a first edge region of the dewarped images; determining, at the video analytics engine, that a second object is: exiting the blind-spot region of the dewarped images, or located at a second edge region of the dewarped images, the second edge region opposite the first edge region; and in response to the second object meeting one or more reidentification conditions associated with the first object, reidentifying, at the video analytics engine, the second object as the first object at the dewarped images.

Another aspect of the present specification provides a device comprising: a controller configured to: convert warped images from a fisheye camera into dewarped images; determine that a first object identified in the dewarped images is: entering a blind-spot region of the dewarped images; or located at a first edge region of the dewarped images; determine that a second object is: exiting the blind-spot region of the dewarped images, or located at a second edge region of the dewarped images, the second edge region opposite the first edge region; and in response to the second object meeting one or more reidentification conditions associated with the first object, reidentify the second object as the first object at the dewarped images.

Each of the above-mentioned aspects will be discussed in more detail below, starting with example system and device architectures of the system in which the embodiments may be practiced, followed by an illustration of processing blocks for achieving an improved technical method, device, and system for identifying objects in warped images from a fisheye camera.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for identifying objects in warped images from a fisheye camera. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

Herein, reference will be made to engines, such as video analytics engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Furthermore, hereafter, the term "warped image" may be understood to include images acquired by a fisheye camera equipped with a fisheye lens that relies on equidistant projection, and the like (e.g., an F-Theta lens, and/or an equiangular lens, and/or equidistant lens, and the like). Similarly the term "non-warped image" may be understood to include images acquired by a camera equipped with a lens that relies on perspective projection, and the like (e.g., an F-TanTheta lens, and/or a rectilinear lens, and/or an orthoscopic lens, and the like); such cameras may also be referred to herein as "regular cameras" to distinguish from fisheye cameras. Similarly, the term dewarped image may be understood to include warped images that were acquired by a fisheye camera and processed to resemble a non-warped image.

The system 100 comprises a video analytics engine 102 in communication with, and/or associated with, a fisheye camera 104, a computing device 106, and a display screen 114.

The video analytics engine 102 may be incorporated with the fisheye camera 104 (e.g., in a system-on-chip architecture), and/or (as depicted) co-located with the fisheye camera 104 (e.g., as a separate device and/or appliance); in other examples, the video analytics engine 102 may be separate from the fisheye camera 104 and/or remote from the fisheye camera 104. For example, the video analytics engine 102 may be hosted at the computing device 106 and/or a cloud computing device and/or more than one cloud computing device (e.g., the functionally of the video analytics engine 102 may be distributed between more than one cloud computing device and the like and/or more than appliance).

The fisheye camera 104 generally comprises a digital and/or electronic camera, including, but not limited to, a video camera, equipped with a fisheye lens, (e.g., an F-Theta lens, and/or an equiangular lens, and the like), as described above. As such, the fisheye camera 104 acquires warped images 108; for example, as depicted, the fisheye camera 104 acquires warped images 108 of a field-of-view thereof which includes a human 110 standing on a floor 112, and provides the warped images 108 to the video analytics engine 102, for example in a stream of the warped images 108, and which may comprise a video stream of the warped images 108 acquired at a video processing rate of the fisheye camera 104.

The fisheye camera 104 may be at a fixed location, for example mounted to a ceiling, and the like, among other possibilities, and may have a fixed field-of-view and the like at the fixed location. Regardless, as depicted, the fisheye camera 104 is understood to be imaging a same view and/or a same plurality of views. In general, the fisheye camera 104 may be mounted in any suitable manner and/or in any suitable location described in further detail below.

As will be explained in further detail below, the video analytics engine 102 is understood to receive the warped images 108 from the fisheye camera 104 and perform any suitable video analytics on the warped images 108 to perform security functionality, and the like. In one example, the video analytics engine 102 may analyze the warped images 108, as described in more detail below, to search for, detect, identify, and track objects in the warped images 108 that correspond to physical objects in the field-of-view of the fisheye camera 104, such as humans (e.g., as depicted), vehicles, animals, and the like (e.g., and which may include classifying detected objects) and the like. Put another way, the human 110 is understood to be one example of a physical object moving relative to the fisheye camera 104 that the video analytics engine 102 may configured to search for, detect, identify, and track, objects corresponding to humans 116 in the warped images 108; however the video analytics engine 102 may be configured to search for, detect, identify, and track, any suitable objects in the warped images 108 corresponding to any suitable physical objects.

The warped images 108 may be modified by the video analytics engine 102 to include a label, such as an object identifier and/the like, to indicate identified objects in warped images 108. Furthermore the warped images 108 may be modified by the video analytics engine 102 to include a bounding box around identified objects, as described in further detail below.

In some examples, the modified warped images may be provided to the computing device 106 by the video analytics engine 102, which may comprise a server, a cloud computing device, a security terminal monitored by security personnel, and the like; and/or the modified warped images may be provided to the display screen 114 by the video analytics engine 102 and/or the computing device 106, which may render the modified warped images for viewing by a user, such as security personnel (not depicted).

The video analytics engine 102, and/or the computing device 106, when finding a given object may generate and provide an alert of the given object, for example at a notification device such as the display screen 114, and the like (e.g., a mobile device, fixed device, a security terminal, and the like, that includes the display screen 114 and/or a speaker) of a business owner, a home owner, a security guard, and the like, associated with a site monitored by the fisheye camera 104, and/or of a first responder, etc.; the video analytics engine 102 and/or the computing device 106 may transmit such an alert via a communication network.

While not depicted, it is hence understood that the video analytics engine 102 is generally may be initially provisioned with video analytics parameters used to perform, for example, one or more of object recognition, object tracking, and the like, and may further define alert sensitivities, which may include conditions under which alerts are generated. Such video analytics parameters may include machine learning classifiers, convolutional neural network layers and/or convolutional neural network object detectors, and the like, and hence the video analytics engine 102 may comprise any suitable machine learning algorithm for identifying objects in images using such video analytics parameters. However, the video analytics engine 102 may use any suitable process for identifying objects in images.

However, as mentioned above, the video analytics engine 102 may be trained (e.g., via providing the video analytics parameters to the video analytics engine 102) to identify objects in non-warped images rather than the warped images 108.

Hence, the video analytics engine 102 is generally configured to convert the warped images 108 into dewarped images.

For example, as depicted in FIG. 1, the video analytics engine 102 has received a warped image 108 that includes an object 116 corresponding to the human 110; for example, the object 116 of the warped image 108 corresponds to an image of the human 110; while not depicted, the warped image 108 may include regions corresponding to the floor 112, and/or any other features and/or objects located in a field-of-view of the fisheye camera 104.

In general, the warped image 108 is circular, as is typical with images acquired using fisheye cameras. As such, the warped image 108 may not strictly have a "top" and/or "bottom" and the like, but the warped image 108, as well as other warped images 108, may be rendered at the display screen 114 with a given predetermined orientation.

While not depicted, the object 116 in the warped image 108 may be further distorted relative to the human 110; as such, the video analytics engine 102 may not be able to detect the object 116 in the warped image 108 as the video analytics engine 102 may be trained to detect humans, and/or other objects, in non-warped images rather than warped images.

As such, the video analytics engine 102 converts the warped image 108 into a dewarped image 118. For example, the video analytics engine 102 may be configured to "unfold", and the like, the warped image 108 into the dewarped image 118 from opposite sides of a line 120 applied to the warped image 108 that extends from a center of warped image 108 to an edge and/or circumference of the warped image 108 (e.g., the line 120 being normal to the circumference of the warped image 108). Put another way, the line 120 corresponds to, and/or is along, a radius of the warped image 108, and the video analytics engine 102 may be configured to "unfold", and the like, the warped image 108 along a radius, and/or a given radius, of the warped image 108, into the dewarped image 118.

For example, the dewarped image 118 may comprise a panorama view of the warped image 108, with a top side 122 corresponding to the circumference of the warped image 108 and/or pixels thereof, and a bottom side 124, opposite the top side 122, corresponding to the center of the warped image 108. As the center of the warped image 108 may comprise a single pixel, and the like, pixels of the bottom side 124 correspond to the single pixel of the center of the warped image 108 "smeared" and/or stretch across a distance similar to, and/or the same as, the top side 122. Indeed, the sides 122, 124 are understood to be generally parallel to each other.

Similarly, the dewarped image 118 comprises opposite sides 126, 128 corresponding to opposite sides 130, 132 of the line 120, the opposite sides 126, 128 corresponding to pixels of the line 120. The opposite sides 126, 128 are understood to be generally parallel to each other and perpendicular to the sides 122, 124. To distinguish from each other, the side 126 is interchangeably referred to hereafter as the left side 126 of the dewarped image 118, and the side 128 is interchangeably referred to hereafter as the right side 128 of the dewarped image 118.

While the terms "top", "bottom", "left" and "right" are used to describe dewarped images 118, it is understood that such orientations are with respect to the figures described herein and the dewarped images 118 may be provided in any suitable orientation.

Hence, it is understood that coordinates and/or pixels of the dewarped image 118 generally correspond to coordinates and/or pixels of the dewarped image 118, and that the video analytics engine 102 may generally map coordinates and/or pixels of the dewarped image 118 to respective coordinates and/or pixels of the warped image 108, and vice versa. In some instances, such correspondence may be one-to-one, while in other instances, such correspondence may be greater than one-to-one; for example, coordinates of the dewarped image 118 along the bottom side 124 may all correspond to a center of the warped image 108. In particular, a dewarping process may include generating pixels of the dewarped image 118 by mapping coordinates and/or pixels of the dewarped image 118 to respective coordinates and/or pixels of the warped image 108 and interpolating pixels of the warped image 108 such that one pixel (e.g., and/or adjacent pixels) of the warped image 108 may be used to determine a plurality of pixels of the dewarped image 118. Hence, unfolding" the warped image 108 along the line 120 into the dewarped image 118 may include, but is not limited to: mapping pixels along the circumference of the warped image 108 to the top edge 122 of the dewarped image 118 (e.g., on a one-to-one basis); mapping pixels of the warped image 108 on opposite sides of the line 120 to pixels at respective edge 126, 128 of the dewarped image 118, and mapping remaining pixels of the warped image 108 to corresponding pixels of the dewarped image 118, interpolating between pixels of the warped image 108 to obtain pixels of the dewarped image 118 when no one-to-one correspondence is available. As will be described below, portions of the warped image 108 may be duplicated at the edge regions 146, 148, and the video analytics engine 102 may hence copy pixels on either side of the line 120 into the edge regions 146, 148 via mapping techniques. Furthermore, in the interpolation, and the like, color values (e.g., red-green-blue (RGB) values) of a pixel in the dewarped image 118 may be determined using color values of a plurality of pixels in the warped image 108 (e.g., an average of color values, and the like).

As such, the dewarped image 118 may represent an attempt by the video analytics engine 102 to generate a non-warped and/or rectilinear image from the warped image 108 using any suitable dewarping process 133 (e.g., represented by an arrow between the images 108, 118). As will next be described, such a dewarping process 133 may include the video analytics engine 102 modifying the warped image 108 based on identifying objects in the dewarped image 118, as described hereafter, for example to include labels and/or bounding boxes corresponding to labels and/or bounding boxes of objects identified in the dewarped image 118, For example, as depicted, the object 116 of the warped image 108 also appears in the dewarped image 118, and the video analytics engine 102 may then apply any suitable object identification process, compatible with non-warped images, to identify the object 116 in the dewarped image 118. For example, as depicted, it is understood that the video analytics engine 102 has been trained to identify humans in non-warped images and, as such, the video analytics engine 102 has generated and/or determined a first bounding box 134 around the object 116 in the dewarped image 118, as well as labelled the object 116 and/or the bounding box 134 with an object identifier of "1". When other objects (not depicted but which may correspond to other humans in the field-of-view of the fisheye camera 104) appear in the warped image 108, and hence also the dewarped image 118, bounding boxes for such objects may also be generated and labelled with other object identifiers (e.g., such as "2", "3", etc.).

It is understood that the first bounding box 134 is generally rectangular with a top and bottom thereof corresponding to a top and bottom of the object 116, and similarly, a left and right side thereof corresponding to a left and right of the object 116, such that the first bounding box 134 encompasses the object 116.

As coordinates of the dewarped image 118 generally correspond to coordinates of the warped image 108, the video analytics engine 102 may convert coordinates of the first bounding box 134 in the dewarped image 118 to corresponding coordinates in the warped image 108 to generate and/or draw a second bounding box 136 in the warped image 108 around the object 116. As depicted, the second bounding box 136 is a trapezoidal shape with coordinates of corners thereof in the warped image 108 corresponding to coordinates of corners of the first bounding box 134 in the dewarped image 118; however the coordinates of the sides of the second bounding box 136 in the warped image 108 are also generally understood to correspond to coordinates of respective of the first bounding box 134 in the dewarped image 118.

Put another way, the video analytics engine 102 may generate and/or draw the second bounding box 136 as a trapezoid in the warped image 108 using the corresponding coordinates of the first bounding box 134, the second bounding box 136 encompassing the object 116 in the warped image 108.

However, alternative to, or in addition to, the second bounding box 136, the video analytics engine 102 may generate and/or draw a third bounding box 138 as a rectangle or a square in the warped image 108, the third bounding box 138 determined from the second bounding box 136, the third bounding box 138 encompassing the object 116 in the warped image 108. In particular, the third bounding box 138 may comprise a smallest square that is bigger than the second bounding box 136 and/or a smallest square that encompasses the second bounding box 136. The third bounding box 138 may be provided in a manner such that sides of the third bounding box 138 are parallel or perpendicular to sides of the display screen 114 when the warped image 108 is rendered at the display screen 114 in the predetermined orientation, as described above. For clarity, the third bounding box 138 is drawn in broken lines while the second bounding box 136 is drawn in solid lines, though the bounding boxes 136, 138 may be provided in any suitable respective format.

While as depicted the warped image 108 is modified to include both the bounding boxes 136, 138, in other examples, the warped image 108 may be modified to include only one of the bounding boxes 136, 138.

In yet further examples, the warped image 108, as modified to include one, or both, of the bounding boxes 136, 138, may be provided to the computing device 106 which may replace one, or both, of the bounding boxes 136, 138 with a rectangular bounding box similar to the first bounding box 134 that encompassed the object 116.

Furthermore, as depicted, the video analytics server 102 has labelled the object 116 and/or the bounding boxes 136, 138 in the warped image 108 with the object identifier of "1" (e.g., the same object identifier of the object 116 in the dewarped image 118).

Hence, the video analytics device 102 generally converts the warped images 108 to corresponding dewarped images 118, and performs object identification processes on the dewarped images 118 to identify objects 116 in the dewarped images 118, which results in a corresponding identification of the objects 116 in the warped images 108. Such performs object identification processes may include, but are not limited to, labelling the objects 116 in both the warped images 108 based on object identifiers determined from the dewarped images 118, and/or generating and/or drawing bounding boxes in both the warped images 108, 118 based on bounding boxes determined from the dewarped images 118.

Furthermore, as the human 110 moves relative to the fisheye camera 104, the identified object 116 moves in the images 108, 118, and the object identifier and/or bounding boxes 134, 136, 138 may move with the object 116 as the video analytics engine 102 tracks the object 116 as it moves.

However, the conversion of the warped image 108 to the dewarped image 118 generally results in certain artifacts and/or time-based artifacts in the dewarped image 118. For example, in the conversion, portions of the warped image 108 near the center are "stretched" and/or "smeared" in the dewarped image 118. Similarly, in the conversion, the opposite sides 126, 128 of the dewarped image 118 are adjacent the same line 120 of the warped image 108, and hence includes images of physically adjacent spaces, which are physically separated in the dewarped image 118.

For example, as described in more detail below, when the human 110 moves directly under the fisheye camera 104, such that the object 116 moves into a center region 140 of the warped image 108 (e.g., the center region 140 encompassing the center of the warped image 108), the object 116 is generally smeared across a corresponding portion of the dewarped image 118, which will be referred to hereafter as the blind-spot region 142. In particular, while the object 116 may have been previously identified by the video analytics engine 102 in the dewarped image 118, when the object 116 enters the blind-spot region 142, the object 116 may be distorted in a manner that prevents the video analytics engine 102 from identifying and/or tracking the object 116; hence, in the blind-spot region 142, the video analytics engine 102 is "blind" to objects it is trained to identify. As such, the object 116 may seem to disappear from the dewarped image 118. However, when the object 116 moves back out of the center region 140 of the warped image 108, the video analytics engine 102 may determine that an object has appeared in the dewarped image 118 from the blind-spot region 142 and may, at least temporality, identify such an object as being different from the object 116 as initially identified; for example, when the object 116 reappears in the dewarped image 118, the video analytics engine 102 may incorrectly label the object 116 with an object identifier of "2".

As such, to reduce and/or mitigate such artifacts, the video analytics engine 102 is generally configured to determine that a first object identified in the dewarped images 108 is entering the blind-spot region 142 of the dewarped images 108 and determine that a second object is exiting the blind-spot region 142 of the dewarped images 108 and, in response to the second object meeting one or more reidentification conditions associated with the first object, reidentify the second object as the first object at the dewarped images 108. Such one or more reidentification conditions are described in further detail below.

Furthermore, a size of the blind-spot region 142 (e.g., a distance from the bottom side 124) may be predetermined and/or correspond to a size of the center region 140 of the warped image 108. For example, a size of the regions 140, 142 may be determined heuristically based on a degree of distortion of objects in the blind-spot region 142 that region that leads to the video analytics engine 102 being unable to identify objects therein. Put another way, size of the blind-spot region 142 may be selected such that, in the blind-spot region 142, the video analytics engine 102 cannot detect objects therein and, out of the blind-spot region 142, the video analytics engine 102 can detect objects therein.

Similarly, when the human 110 moves such that the corresponding object 116 crosses the line 120 in the warped image 108, in the dewarped image 118 the object 116 may disappear from one side 126, 128 and appear on an opposite side 126, 128; again, the video analytics engine 102 may identify the object 116 that appears one side 126, 128 as being different from the object 116 that has disappeared from the opposite side 126, 128.

As such, to reduce and/or mitigate such artifacts, the video analytics engine 102 is generally configured to determine that a first object identified in the dewarped images 108 is located at a first edge region of the dewarped images 108 and determine that a second object located at a second edge region of the dewarped images 108, the second edge region opposite the first edge region and, in response to the second object meeting one or more reidentification conditions associated with the first object, reidentify the second object as the first object at the dewarped images 108. For example, as depicted the dewarped image 108 includes respective edge regions 146, 148 adjacent the opposite sides 126, 128, and which may be within respective predefined distances from the opposite sides 126, 128, for example, as indicated by respective margins 150, 152.

Respective sizes of the edge regions 146, 148 (e.g., and/or respective positions of the margins 150, 152) may be determined heuristically and/or may comprise respective given portions of the dewarped image 118, such 5%, 10%, 15% of the dewarped image 118 starting from a respective side 126, 128, and/or any other suitable number. In these examples, a first edge region 146 and a second edge region 148 may be understood to be within respective predefined distances (e.g., as indicated by the margins 150, 152) from the opposite sides 126, 128.

However, in other examples, an edge region 146, 148 may exactly correspond to a respective side 126, 128, such that, for an object to be located "in" and/or "at" an edge region 146, 148, the object is touching and/or overlaps with a side 126, 128. In such an example, when the human 110 is located, relative to the fisheye camera 104, such that the object 116 is "on" the line 120 in the warped images 108, in the dewarped images 118 the object 116 may appear partially in the edge region 146 and partially in the opposite edge region 148 (e.g., as "cut" through the line 120). In these examples, a first edge region 146 and a second edge region 146 may be understood to be at opposite sides 126, 128 of the dewarped images 118 and/or a panorama view of the warped images 108.

In yet further examples, not depicted, the dewarped image 108 may be modified (e.g., as compared to that depicted), by including, at the sides 126, 128, a same region of the warped image 108. For example, while heretofore the sides 126, 128 have been described as exactly corresponding to the line 120, in other examples, the edge regions 146, 148, may correspond to a same portion of the warped image 108 centered, for example, on the line 120. As such, when the object 116 moves into one edge region 146, 148, the object 116 may simultaneously appear (and/or partially appear) in the opposite edge region 146, 148. Put another way, when converting the warped images 108 to the dewarped images 118, the video analytics device 102 may duplicate one or more portions of the warped images 108 adjacent the line 120 at both edge regions 146, 148, such that the one or more portions of the warped images 108 adjacent the line 120 are located (e.g. as dewarped) at both edge regions 146, 148.

In some examples, a size of one or more of the first edge region 146 and the second edge region 148 may change depending on one or more of a speed of the object 116 in the dewarped images 118, a video processing rate of the warped images 108; and a position of the object in the dewarped images 108. For example, the faster the object 116, the larger the edge regions 146, 148, and vice versa. Conversely, the faster the video processing rate, the smaller the edge regions 146, 148, and vice versa.

Regardless, of shape and/or size of the edge regions 146, 148, the edge regions 146, 148 be understood to be regions of proximity to the sides 126, 128 and/or to the line 120, objects 116 located in the edge regions 126, 128 are checked, by the video analytics engine 102, for potential transitions from one side 126, 128 of the dewarped images 118 to an opposite side of the dewarped images 118.

Furthermore, due to the conversion process, when the human 110 is moving at a constant speed, in the dewarped images 118, the corresponding object 116 may seem to move faster when located closer to the blind-spot region 142 and/or the bottom side 124 as compared to when located closer to the top side 122. As such, the closer the object 116 is to the bottom side 124 and/or the blind-spot region 142, the larger the edge regions 146, 148, and vice versa.

In some of these examples, the edge regions 146, 148 may further not be rectangularly shaped, as depicted, but may be smaller closer to the top side 122 and larger closer to the bottom side 124 and/or the blind-spot region 142, among other possibilities.

When the size and/or shape of the edge regions 146, 148 change, such changes may be determined heuristically, and may depend on processing resources available at the video analytics engine 102. For example, size and/or shape of the edge regions 146, 148 may change such that there is sufficient time (as determined heuristically) to reidentify a second object as a first object at the dewarped images 108, as described herein.

Hence, in general, the fisheye camera 104 is understood to be mounted in a manner such that physical objects, such as the human 110, may move relative to the fisheye camera 104 and the corresponding object 116 in the warped images 108 may move into the center region 140 and/or cross the line 120. In many examples, such conditions are met when the fisheye camera 104 is mounted to a ceiling, and the like, and/or a field-of-view of the fisheye camera 104 is in a downward direction, for example towards the floor 112, and the like. However, the fisheye camera 104 may be mounted in any suitable manner where an object 116 in the warped images 108, corresponding to a physical object moving relative to the fisheye camera 104, may move into the center region 140 and/or cross the line 120; for example, the fisheye camera 104 may be mounted such that a field-of-view thereof is towards a hill and/or a slope and/or stairs, among other possibilities.

Figure 2:
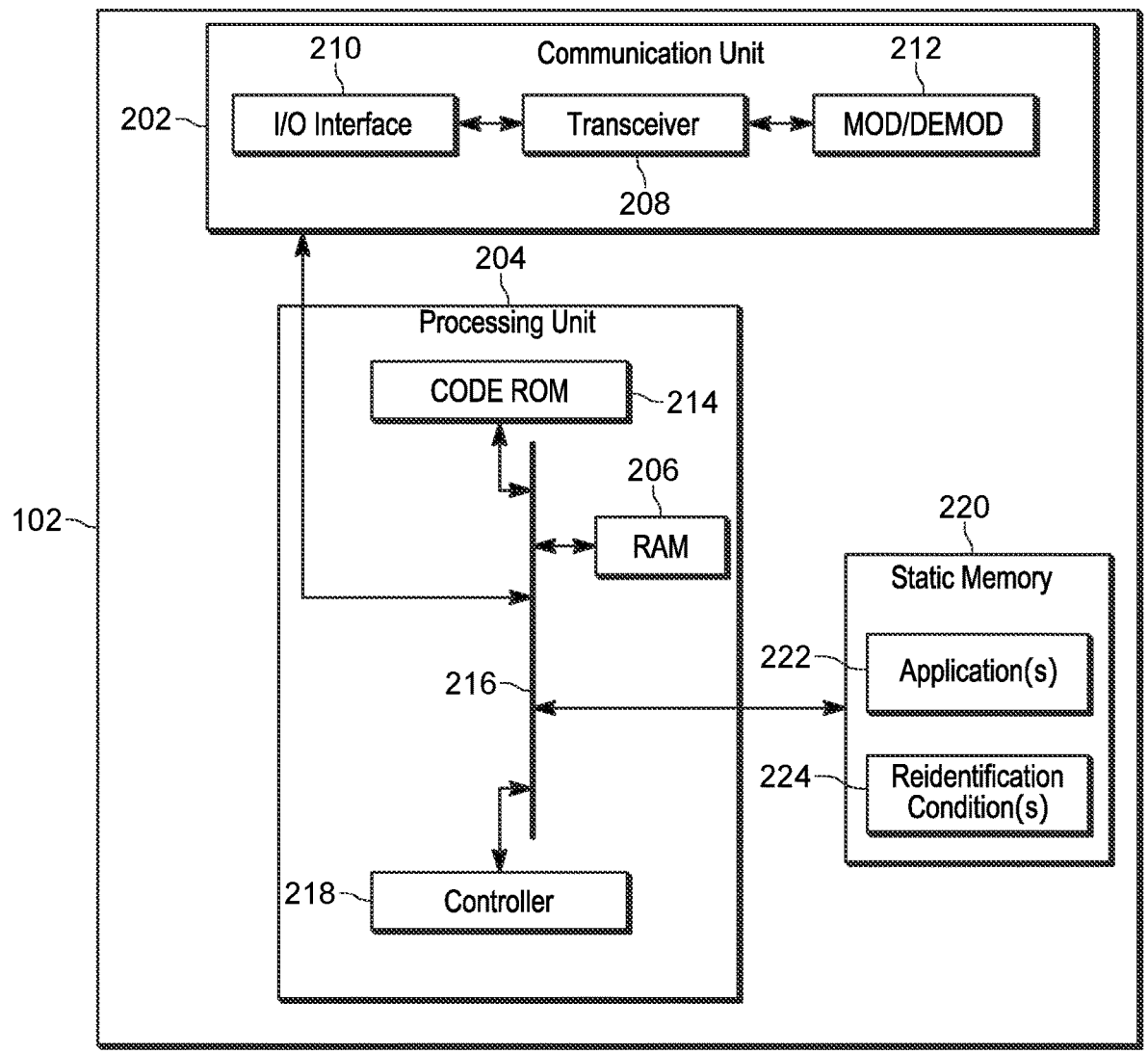
FIG. 2 is a device diagram showing a device structure of a device for identifying objects in warped images from a fisheye camera, in accordance with some examples.

Attention is next directed to FIG. 2 which depicts a schematic block diagram of an example of the video analytics engine 102. While the video analytics engine 102 is depicted in FIG. 2 as a single component, functionality of the video analytics engine 102 may be distributed among a plurality of components and the like.

As depicted, the video analytics engine 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the video analytics engine 102 may have any suitable structure and/or configuration.

While not depicted, the video analytics engine 102 may include one or more of an input component and a display screen and the like.

As shown in FIG. 2, the video analytics engine 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the video analytics engine 102 is not a generic controller and/or a generic device, but a device specifically configured to implement functionality for identifying objects in warped images from a fisheye camera. For example, in some examples, the video analytics engine 102 and/or the controller 218 specifically comprises a computer executable engine configured to implement functionality for identifying objects in warped images from a fisheye camera.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the video analytics engine 102 as described herein are maintained, persistently, at the memory 220 and used by the controller 218, which makes appropriate utilization of volatile storage during the execution of such programming instructions.

Figure 3:
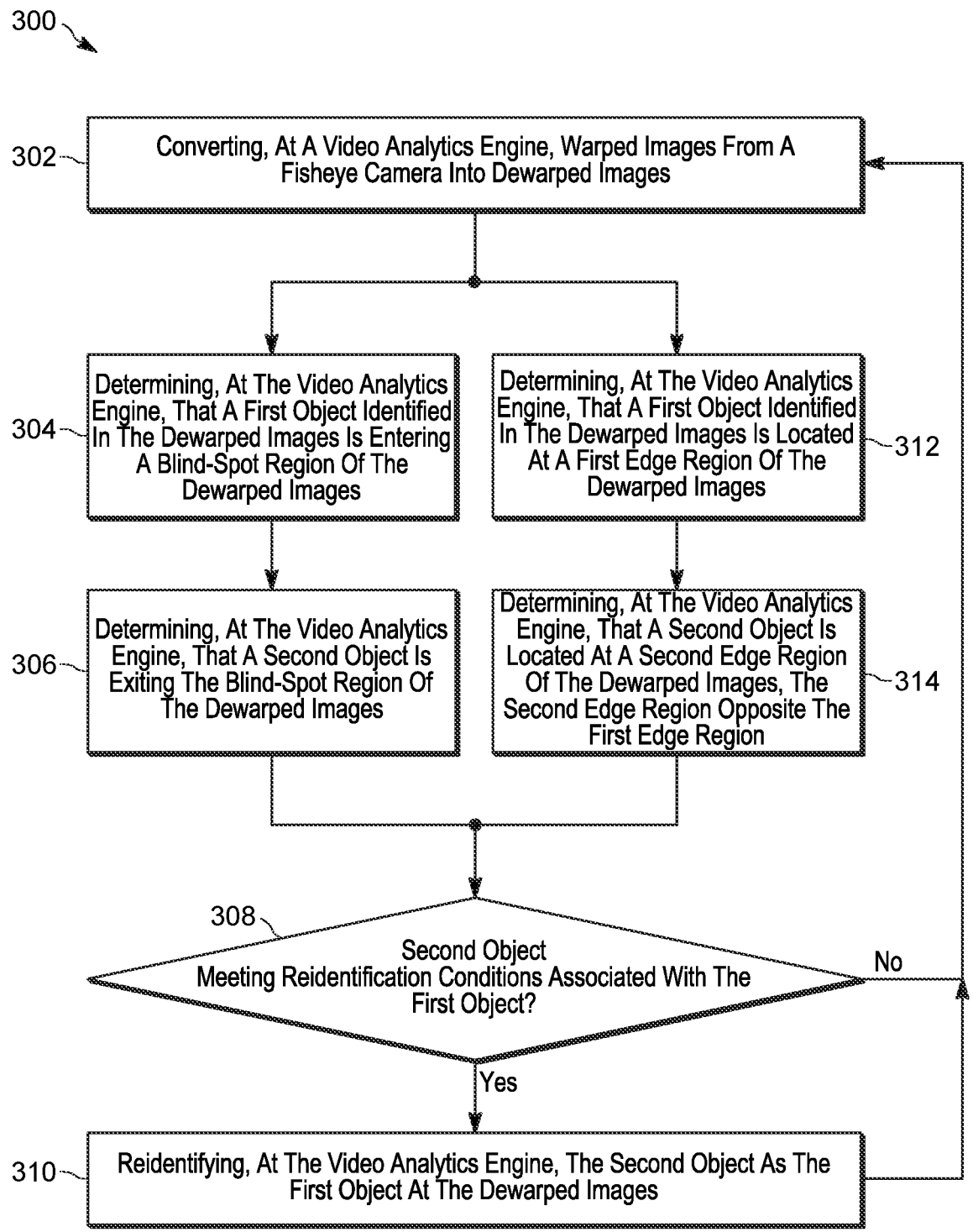
FIG. 3 is a flowchart of a method for identifying objects in warped images from a fisheye camera, in accordance with some examples.

In particular, the memory 220 stores instructions corresponding to the at least one application 222 that, when executed by the controller 218, enables the controller 218 to implement functionality for identifying objects in warped images from a fisheye camera, including but not limited to, the blocks of the method set forth in FIG. 3. Similarly, the application 222 when executed by the controller 218 may enable the controller 218 to implement the dewarping process 133.

As depicted, the memory 220 further stores one or more reidentification conditions 224 for identifying a second object as a previously identified first object.

Hence, the one or more reidentification conditions 224 may comprise rules and/or conditions for identifying a second object as a previously identified first object.

In some examples, one or more reidentification conditions 224 may be based on visual appearance and/or appearance features of the second object relative to respective visual appearance and/or respective appearance features of the first object. For example, when the objects may have a same and/or similar visual appearance and/or same and/or similar appearance features (e.g., within a threshold confidence value as determined using machine learning algorithms and the like), the second object may be identified as the first object. Similarly, a similarity score between the appearance features of the first object and the second object may be determined and compared to a threshold similarity value; when the similarity score is higher than the threshold similarity value, the second object may be identified as the first object. The appearance features may include, but are not limited to, feature-related vectors, facial landmarks, gait (e.g. data indicating gait), and the like, for detecting humans, animals, and the like; as such, in these examples, the video analytics device 102 may be configured to determine, and at least temporarily store, such appearance features.

Yet further reidentification conditions 224 may be based on respective trajectories and/or respective velocities of the objects in the dewarped images 118, for example relative to the blind-spot region 142, or the edge regions 146, 148. In particular, using the trajectory and/or velocity of the first object, which may disappear from the dewarped images 118 as the first object enters the blind-spot region 142 at a first location adjacent the blind-spot region 142, a reappearance location may be predicted adjacent the blind-spot region 142. Similarly, a reappearance time of the first object adjacent the blind-spot region 142 may be predicted, relative to a disappearance time of the first object adjacent the blind-spot region 142. Hence, when a second object appears at the reappearance location, and/or at the reappearance time, the second object may be identified as the first object.

Similar one or more reidentification conditions 224 may be provided for the edge regions 146, 148, In particular, using the trajectory and/or velocity of the first object, which may enter the first edge 146, a reappearance location of the first object may be predicted in the second edge region 148 (or vice versa). Similarly, a reappearance time of the first object may be predicted in the second edge region 148, relative to a disappearance time of the first object in the first edge region 146 (or vice versa). Hence, when a second object appears at the reappearance location and/or at the reappearance time in the second edge region 148, the second object may be identified as the first object.

As such, in these examples, one or more reidentification conditions 224 may comprise a second object appearing at a predicted reappearance location of the first object. Put another way, such reidentification conditions 224 may be based on a location of the second object exiting the blind-spot region 142 relative to a respective location of a first object entering the blind-spot region 142. Similarly, one or more reidentification conditions 224 may be based on a location of the second object at the second edge region 148 relative to a respective location of the first object at the first edge region 148 (or vice versa).

Hence, in summary, the one or more reidentification conditions 224 may be based on one or more of: a respective trajectory of one or more of the first object and the second object; a respective velocity of one or more of the first object and the second object; a location of the second object exiting the blind-spot region or at the second edge region, relative to a respective location of the first object entering the blind-spot region or at the first edge region; an appearance time of the second object relative to a disappearance time of the first object (e.g., and/or a predicted reappearance time of the first object relative to an appearance time of the second object); and a visual appearance and/or appearance features of the second object relative to a respective visual appearance and/or respective appearance features the first object, among other possibilities.

In illustrated examples, when the controller 218 executes the one or more applications 222, the controller 218 is enabled to: convert warped images from a fisheye camera into dewarped images; determine that a first object identified in the dewarped images is: entering a blind-spot region of the dewarped images; or located at a first edge region of the dewarped images; determine that a second object is: exiting the blind-spot region of the dewarped images, or located at a second edge region of the dewarped images, the second edge region opposite the first edge region; and in response to the second object meeting one or more reidentification conditions associated with the first object, reidentifying, at the video analytics engine, the second object as the first object at the dewarped images.

The application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

While the components of the computing device 106 are not depicted, it is understood that components of the computing device 106 may be similar to the components of the video analytics engine 102, but adapted for respective functionality thereof which may include, but is not limited to alert generation, and the like, for example when an object in a warped image 108 and/or a dewarped image 118 meets predefined criteria for generating an alert (e.g., for when objects in the images 108, 118 enter predefined regions of the images 108, 118, cross predefined lines and/or beams in the in the images 108, 118, etc.).

Attention is now directed to FIG. 3 which depicts a flowchart representative of a method 300 for identifying objects in warped images from a fisheye camera. The operations of the method 300 of FIG. 3 correspond to machine readable instructions that are executed by the video analytics engine 102, and specifically the controller 218 of the video analytics engine 102. In the illustrated example, the instructions represented by the blocks of FIG. 3 are stored at the memory 220 for example, as the application 222. The method 300 of FIG. 3 is one way in which the controller 218 and/or the video analytics engine 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the video analytics engine 102, converts the warped images 108 from the fisheye camera 104 into dewarped images 118, as described above. In particular, the warped images 108 may be received as video stream from the fisheye camera 104 according to a video processing rate of the fisheye camera 104, and the like; as the warped images 108 are received, the controller 218 and/or the video analytics engine 102 may converts the warped images 108 into dewarped images 118 on a one-to-one basis and/or the controller 218 and/or the video analytics engine 102 may concurrently convert a plurality of the warped images 108 into dewarped images 118, and the like.

The controller 218 and/or the video analytics engine 102 is understood to identify and track objects in the dewarped images 118, as described above. The controller 218 and/or the video analytics engine 102 may then mitigate artifacts and/or time-based in the dewarped images 118 as described above depending, for example, on whether an identified object that is being tracked enters the blind-spot region 142 of the dewarped images 118, or is located at an edge region 146, 148. Such processes are next described and can occur independently of one another.

Mitigating artifacts associated with the blind-spot region 142 are first described with respect to block 304, block 306, block 308 and block 310. Thereafter, Mitigating artifacts associated with the edge regions 146, 148 are described with respect to block 312, block 314, block 308 and block 310.

Furthermore, hereafter, the object 116 is interchangeably referred to as a first object 116 identified in the dewarped images 118.

At a block 304, the controller 218 and/or the video analytics engine 102 determines that the first object 116 identified in the dewarped images 118 is entering the blind-spot region 142 of the dewarped images.

For example, the controller 218 and/or the video analytics engine 102 may track the location of the first object 116 and determine that the first object 116 has a trajectory towards the blind-spot region 142 and/or a portion of the first object 116 may be adjacent the blind-spot region 142; regardless, the first object 116 disappears from the dewarped images 118 (e.g., is no longer detected) after being adjacent the blind-spot region 142.

At a block 306, the controller 218 and/or the video analytics engine 102 determines that a second object is exiting the blind-spot region 142 of the dewarped images 118.

For example, the controller 218 and/or the video analytics engine 102 may determine that a second object (i.e. which may be the first object 116) has appeared adjacent the blind-spot region 142 of the dewarped images 118 and/or the second object may have a trajectory away from the blind-spot region 142. Regardless, such a second object may initially, and erroneously, seem to be a new object as the second object may be the first object 116 exiting the blind-spot region 142.

As such, at a block 308, the controller 218 and/or the video analytics engine 102 determines whether the second object meets one or more reidentification conditions 224 associated with the first object 116.

For example, the controller 218 and/or the video analytics engine 102 may compare a visual appearance and/or appearance features of the second object relative to the first object 116 to determine whether the second object appears similar to, and/or the same as, the first object 116 within a threshold confidence value, such as 70%, 80%, 90%, among other possibilities, such a threshold similarity value (e.g., which may be set in an associated reidentification condition 224, as described above). In such examples, the controller 218 and/or the video analytics engine 102 are understood to determine and store (e.g., at least temporarily) an image and/or appearance features of the first object 116 in any suitable manner so that the visual appearance and/or appearance features of the second object may be compared against visual appearance and/or appearance features of the first object 116. When the visual appearance of the second object appears similar to, and/or the same as, the first object 116, (e.g., within the threshold confidence), the controller 218 and/or the video analytics engine 102 may determine that the second object meets a reappearance condition 224.

In another example, the controller 218 and/or the video analytics engine 102 may determine a trajectory and/or velocity and/or disappearance location and/or disappearance time of the first object 116, for example relative to the blind-spot region 142, and predict a reappearance location and/or reappearance time of the first object 116 relative to the blind-spot region 142. When the second object appears at the reappearance location and/or reappearance time predicted for the first object 116, the controller 218 and/or the video analytics engine 102 may determine that the second object meets a reappearance condition 224.

In response to the second object meeting one or more reidentification conditions 224 associated with the first object (e.g., a "YES" decision) at the block 308, at a block 310, the controller 218 and/or the video analytics engine 102 reidentifies the second object as the first object 116 at the dewarped images 118. For example, the controller 218 and/or the video analytics engine 102 may associate the object identifier associated with the first object 116 (e.g., "1") with the second object and the like. Thereafter, the controller 218 and/or the video analytics engine 102 continues to convert received warped images 108 to dewarped images 118 at the block 302.

However, in response to the second object not meeting one or more reidentification conditions 224 associated with the first object (e.g., a "NO" decision) at the block 308, the controller 218 and/or the video analytics engine 102 may identify the second object as a new object and assign a new object identifier thereto, and the like. Thereafter, the controller 218 and/or the video analytics engine 102 continues to convert received warped images 108 to dewarped images 118 at the block 302.

Attention is next directed to block 312, at which the controller 218 and/or the video analytics engine 102 determines that the first object 116 identified in the dewarped images 118 is located at a first edge region of the dewarped images 118, such as the edge region 146. To illustrate this example, hereafter the edge region 146 will be referred to as the first edge region 146 and the edge region 148 will be referred to as the second edge region 148; such examples hence assume that the first object 116 is initially located in the edge region 146 though, in other examples, the first object 116 may be initially located in the edge region 148 (i.e. the first edge region of the block 312 may be either of the edge regions 146, 148, and the second edge region of the block 314, described hereafter, may be the other of the edge regions 146, 148).

At a block 314, the controller 218 and/or the video analytics engine 102 determines that a second object is located at a second edge region 148 of the dewarped images 118, the second edge region 148 opposite the first edge region 146. It is understood in the block 312, and the block 314 that the opposite edge regions 146, 148 correspond to regions adjacent to where circular warped images 108 are "cut", and the like, along the line 120 to unfold the warped images 108 into the dewarped images 118.

In some examples, the first object 116 may disappear from the first edge region 146 and the second object may appear in the second edge region 148 thereafter and/or concurrently appear as the first object 116 disappears. In other examples, the first object 116 and the second object may concurrently appear, and/or partially appear in the respective edge regions 146 148 (e.g., when the respective edge regions 146 148 include duplicated regions of the warped image 108).

At the block 308, the controller 218 and/or the video analytics engine 102 determines whether the second object meets one or more reidentification conditions 224 associated with the first object 116, but with respect to the edge regions 146, 148 rather than the blind-spot region 142 as described above.

For example, the controller 218 and/or the video analytics engine 102 may compare visual appearances and/or appearance features of the second object and the first object 116 and determine that the visual appearances are within a threshold confidence level and/or that a similarly score of the appearance features are above a threshold similarly score, and the like. Alternatively, the controller 218 and/or the video analytics engine 102 may determine a trajectory and/or velocity and/or disappearance location and/or disappearance time of the first object 116, for example relative to the first edge region 146, and predict a reappearance location and/or reappearance time of the first object 116 relative to the second edge region 148. When the second object appears at the reappearance location and/or reappearance time predicted for the first object 116, the controller 218 and/or the video analytics engine 102 may determine that the second object meets a reappearance condition 224.

In response to the second object meeting one or more reidentification conditions 224 associated with the first object (e.g., a "YES" decision) at the block 308, at the block 310, the controller 218 and/or the video analytics engine 102 reidentifies the second object as the first object 116 at the dewarped images 118, as described above.

Other features are within the scope of the method 300.

For example, the controller 218 and/or the video analytics engine 102 may label the first object 116 in the warped images 108 and/or the dewarped images 118, as described above (e.g., when the first object 116 is identified). Similarly, the controller 218 and/or the video analytics engine 102 may label (e.g., at the block 310) the second object as the first object 116 in the warped images 108 and/or the dewarped images 118, such that one or more of a same label and a same object identifier is used for both the first object 116 and the second object. As such, the controller 218 and/or the video analytics engine 102 may track the second object labelled as the first object 116 in the warped images 108 and/or the dewarped images 118.

In yet other examples, the method 300 may further include the controller 218 and/or the video analytics engine 102: identifying an object at the warped images 108 by: determining a first bounding box of the object in the dewarped images 118; converting coordinates of the first bounding box in the dewarped images 118 to corresponding coordinates in the warped images 108; and, one or more of: drawing a second bounding box as a trapezoid in the warped images 108 using the corresponding coordinates of the first bounding box, the second bounding box encompassing the object in the warped images 108; and drawing a third bounding box as a rectangle or a square in the warped images 108, as determined from the second bounding box, the third bounding box encompassing the object in the warped images 108. Such examples were described above with respect to FIG. 1 and the bounding boxes 134, 136, 138.

Figure 4:
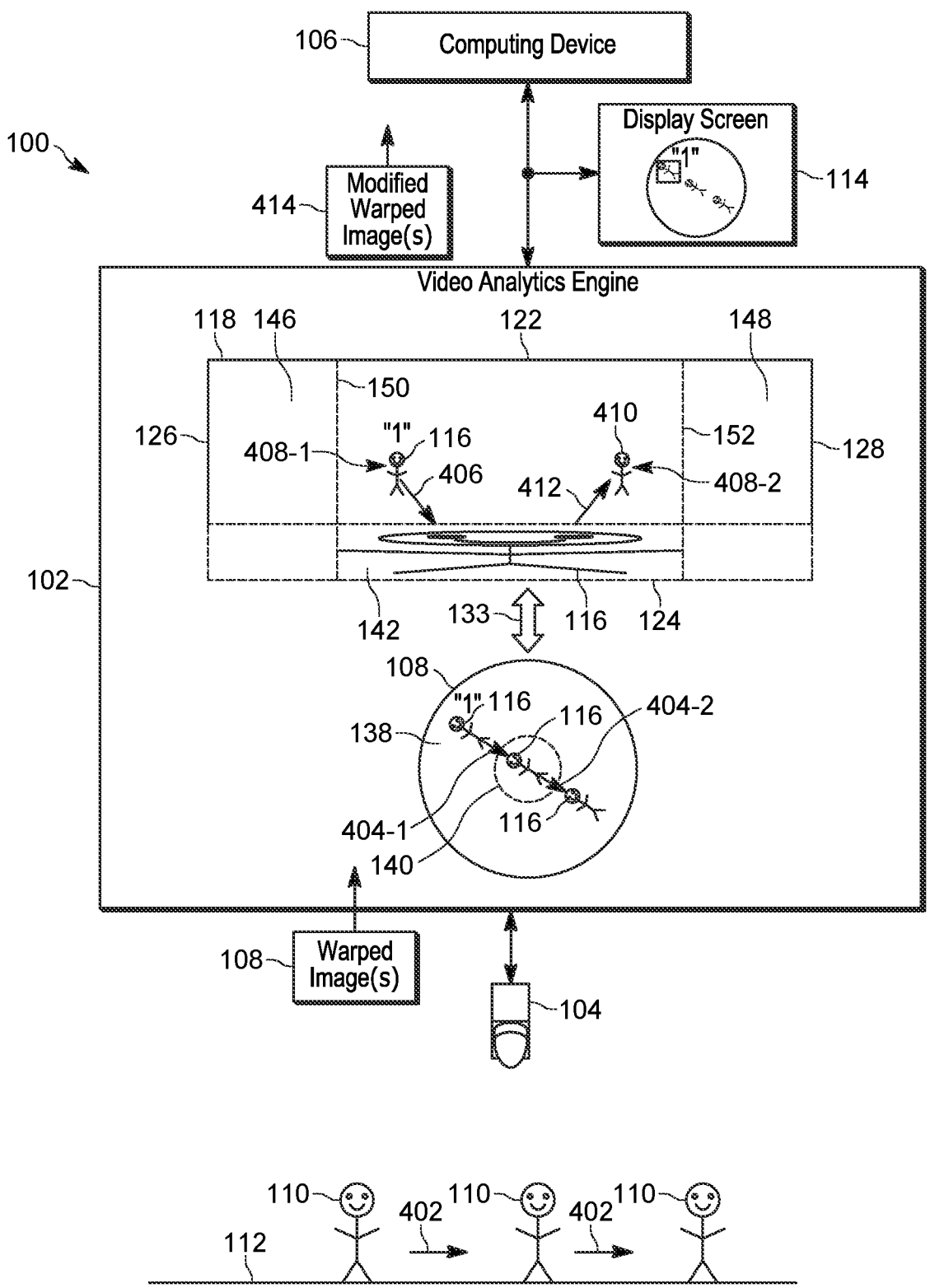
FIG. 4 depicts the system of FIG. 1 implementing a method for identifying objects in warped images from a fisheye camera, with respect to a blind-spot region of dewarped images, in accordance with some examples.
Figure 5:
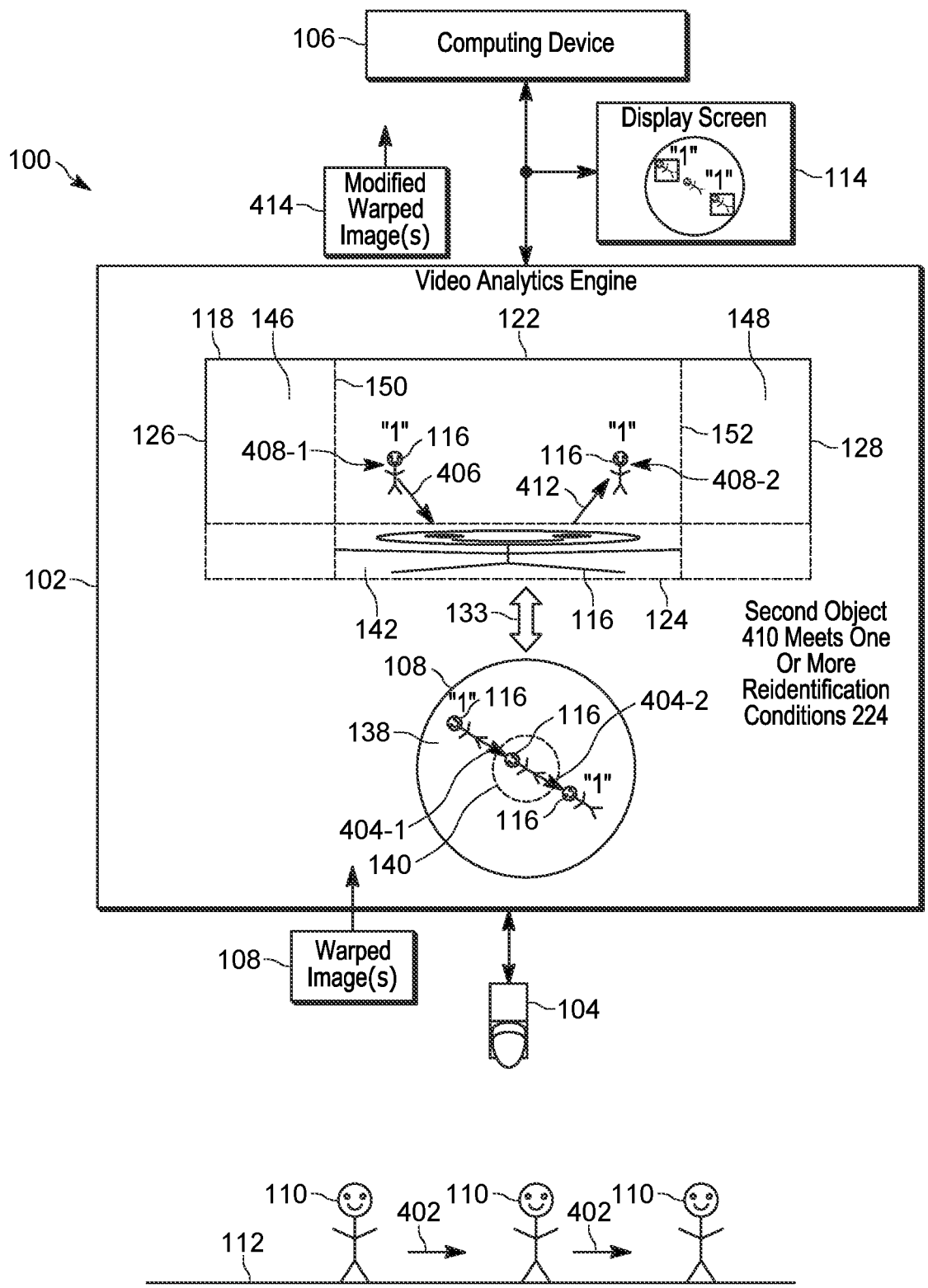
FIG. 5 depicts the system of FIG. 1 continuing to implement the method for identifying objects in warped images from a fisheye camera, with respect to the blind-spot region of dewarped images, in accordance with some examples.

Attention is next directed to FIG. 4 and FIG. 5, which depicts aspects of the method 300 with respect to the blind-spot region 142. FIG. 4 and FIG. 5 are substantially similar to FIG. 1 with like components having like numbers. While not all components of FIG. 1 are indicated in FIG. 4 and FIG. 5, they are nonetheless understood to be present.

In FIG. 4, the human 110 is understood to be moving left to right (e.g., with respect to the page of FIG. 4), as indicated by the arrows 402, such that the human 110 moves from the left of the fisheye camera 104 to under the fisheye camera 104 and then to the right of the fisheye camera 104. In particular, three positions of the human 110 are depicted.

Warped images 108 and dewarped images 118 at the video analytics engine 102 are next described. However, while only one warped image 108 and one dewarped image 118 are depicted at the video analytics engine 102, the warped image 108 and the dewarped image 118 are understood to represent at least three warped images 108 and at least three dewarped images 118 with the object 116 at the three positions of the human 110 depicted in FIG. 4. Hence, in general, in FIG. 4, the video analytics engines 102 converts (e.g., at the block 302 of the method 300) the warped images 108 into the dewarped images 118.

In the warped images 108 received at the video analytics engine 102, that correspond to the three positions of the human 110, the object 116 moves from a first position (e.g., similar to that depicted in FIG. 1), as indicated by an arrow 404-1, through the center region 140 to a second position, as indicated by an arrow 404-2, at an opposite side of the center region 140, as compared to the first position. In particular, the arrow 404-1 represents a trajectory of the object 116 entering the center region 140, and the arrow 404-2 represents a trajectory of the object 116 exiting the center region 140.

Hence, in the corresponding dewarped images 118, as indicated by the arrow 406, the object 116 moves from a first location 408-1 (e.g., similar to that depicted in FIG. 1) and into the blind-spot region 142 where distortions (e.g., as depicted) prevent the video analytics engine 102 from identifying and/or tracking the object 116. Hence, the object 116 seems to disappear from the dewarped images 118. The arrow 406 generally represents a trajectory of the object 116 entering the blind-spot region 142. Hence, the video analytics engine 102 is understood to determine (e.g., at the block 304) that the first object 116, identified in the dewarped images 118, as described above and indicated by the object identifier "1", is entering the blind-spot region 142. The object identifier "1" is also indicated in the warped images 108 adjacent the object 116 at the initial position which corresponds to the first location 408-1.

However, as the object 116 moves out of the center region 140 of the warped images 108, a second object 410 appears to exit the blind-spot region 142 and appears at a location 408-2 adjacent the blind-spot region 142 at a second location 408-2, as represented by an arrow 412 which generally represents a trajectory of the second object 410 exiting the blind-spot region 142. Hence, the video analytics engine 102 is understood to determine (e.g., at the block 306 of the method 300) that the second object 410 is exiting the blind-spot region 142. However, initially, the video analytics engine 102 may not assign an object identifier to the second object 410 until determining whether the second object 410 meets one or more reidentification conditions 224 associated with the first object 116. As such, the second object 410 is not depicted with an object identifier and similarly, the first object 116 in the warped images 108 at the second position at the opposite side of the center region 140, as compared to the first position of the first object 116 in the warped images 108, is not depicted with an object identifier.

As also depicted in FIG. 4, modified warped images 414 may be provided to the computer device 106 and/or the display screen 114. In particular, as depicted, the modified warped images 414 rendered at the display screen 114 include the warped images 108 modified to include the object identifier of "1" and a bounding box (e.g., similar to the bounding box 138) around the first object 116 at the first position that corresponds to the location 408-1, but not at the first object 116 at the second position that corresponds to the location 408-2.

FIG. 4 is next compared to FIG. 5, which indicates that the video analytics engine 102 has determined (e.g., at the block 308 of the method 300) that the second object 410 (e.g., of FIG. 4) meets one or more of the reidentification conditions 224. For example, based on the trajectory represented by the arrow 406, the video analytics engine 102 may determine and/or predict that the first object 116 will reappear at the location 408-2, and/or will have the trajectory represented by the arrow 412. Hence, in FIG. 4, as the second object 410 has appeared at the location 408-2, and/or has the trajectory represented by the arrow 412, the video analytics engine 102 reidentifies, in FIG. 5, (e.g., at the block 310 of the method 300) the second object 410 as the first object 116 at the dewarped images 118. As such comparing FIG. 5 with FIG. 4, the second object 410 of FIG. 4 has been identified as the first object 116 in FIG. 5. Similarly, as depicted, the first object 116 at the location 408-2 is labelled with the same object identifier "1" as the first object 116 at the first location 408-1, and, similarly, in the warped images 108, the first object 116 at the second position at the opposite side of the center region 140, is also labelled with the same object identifier of "1".

Similarly, the modified warped images 414 rendered at the display screen 114 include the warped images 108 modified to include the object identifier of "1" and a bounding box (e.g., similar to the bounding box 138) around the first object 116 at the first position that corresponds to the location 408-1 and at the first position that corresponds to the location 408-2.

It is further understood in FIG. 4 and FIG. 5 that, as the first object 116 disappeared when in the blind-spot region 142, in the center region 140 of the warped images 108, the first object 116 is not labelled and no bounding box is provided.

Figure 6:
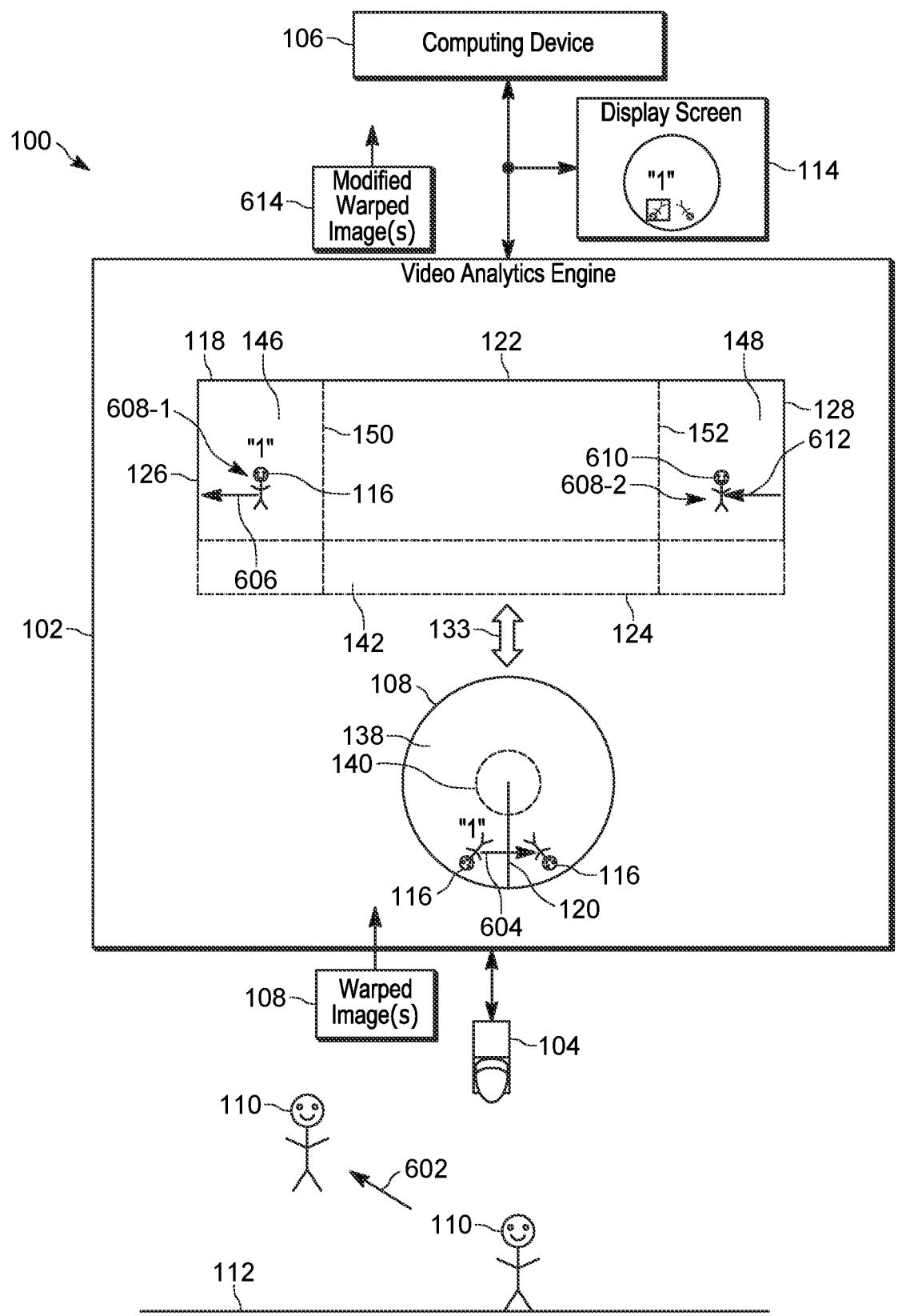
FIG. 6 depicts the system of FIG. 1 implementing a method for identifying objects in warped images from a fisheye camera, with respect to edge regions of dewarped images, in accordance with some examples.
Figure 7:
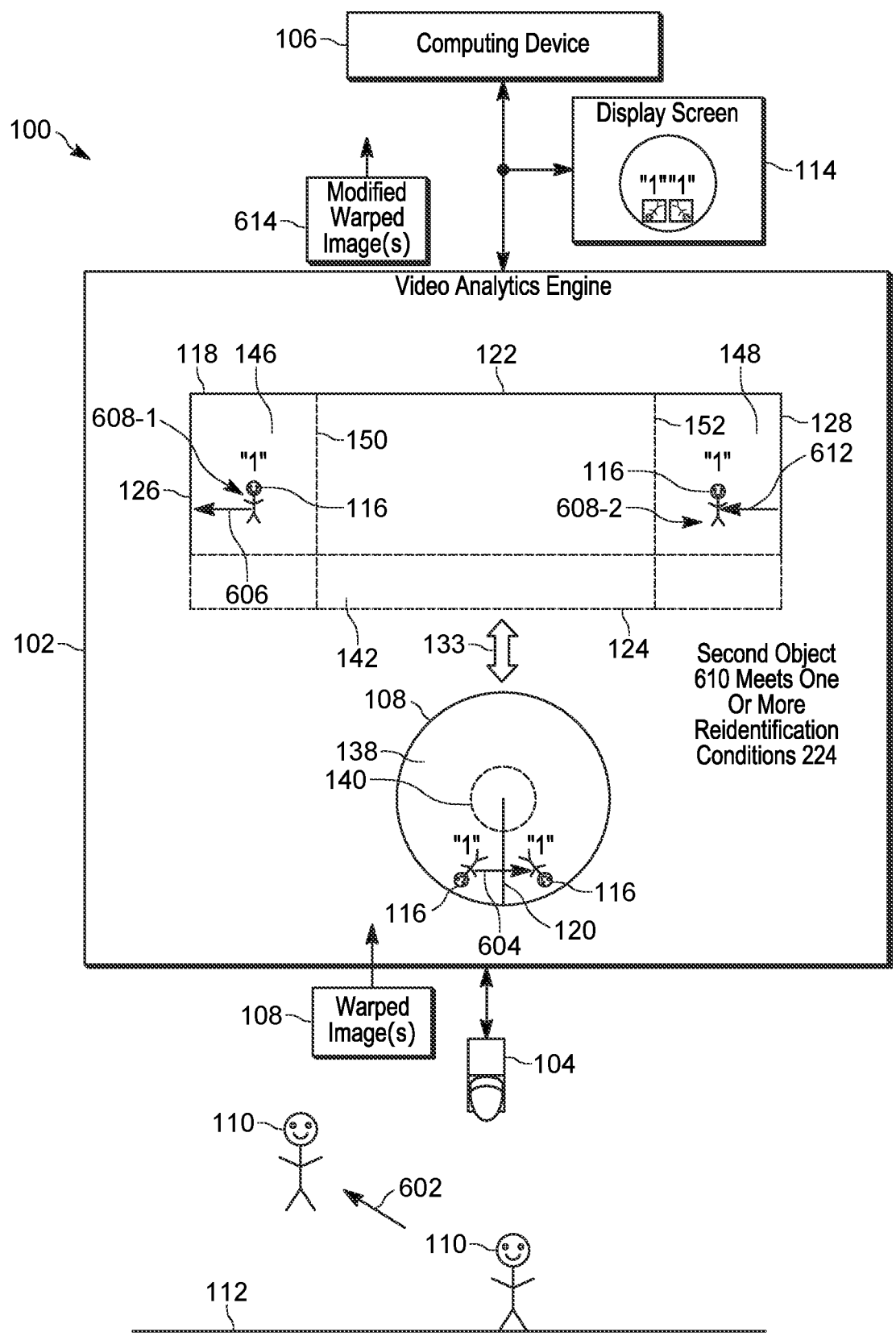
FIG. 7 depicts the system of FIG. 1 continuing to implement the method for identifying objects in warped images from a fisheye camera, with respect to the edge regions of dewarped images, in accordance with some examples.

Attention is next directed to FIG. 6 and FIG. 7, which depicts aspects of the method 300 with respect to the edge regions 146, 148. FIG. 6 and FIG. 7 are substantially similar to FIG. 1 with like components having like numbers. While not all components of FIG. 1 are indicated in FIG. 6 and FIG. 7, they are nonetheless understood to be present.

In FIG. 6, the human 110 is understood to be moving through a region at the floor 112 that corresponds to the line 120 in the warped images 108, as indicated by the arrow 602. In particular, two positions of the human 110 are depicted.

Warped images 108 and dewarped images 118 at the video analytics engine 102 are next described. However, while only one warped image 108 and one dewarped image 118 is depicted at the video analytics engine 102, the warped image 108 and the dewarped image 118 are understood to represent at least two warped images 108 and at least two dewarped images 118, with the object 116 at the two positions of the human 110 depicted in FIG. 6. Hence, in general, in FIG. 6, the video analytics engines 102 converts (e.g., at the block 302 of the method 300) the warped images 108 into the dewarped images 118.

In the warped images 108 received at the video analytics engine 102, that correspond to the two positions of the human 110, the object 116 moves from a first position (e.g., similar to that depicted in FIG. 1), as indicated by the arrow 604 to a second position. In particular, the arrow 604 represents a trajectory of the object 116 as the object 116 passed through the line 120.

Hence, in the corresponding dewarped images 118, as indicated by the arrow 606, the object 116 moves from a first location 608-1 (e.g., similar to that depicted in FIG. 1) out of the first edge region 146, and a second object 610 appears in the second edge region 148 in a second location 608-2.

Hence, the object 116 seems to disappear from the first edge region 146 and the second object 610 appears in the second edge region 148. The arrow 612 generally represents a trajectory of the second object 610 as it enters the second edge region 148. Alternatively, the objects 116, 610 may appear concurrently in the respective edge regions 146, 148.

Regardless, the video analytics engine 102 is understood to determine (e.g., at the block 312 of the method 300) that the first object 116, identified in the dewarped images 118, as described above and indicated by the object identifier "1", is located in the first edge region 146. The object identifier "1" is also indicated in the warped images 108 adjacent the object 116 at the initial position which corresponds to the first location 608-1.

Similarly, the video analytics engine 102 is understood to determine (e.g., at the block 314 of the method 300) that the second object 610 is located in the second edge region 148. However, initially, the video analytics engine 102 may not assign an object identifier to the second object 610 until determining whether the second object 610 meets one or more reidentification conditions 224 associated with the first object 116. As such, the second object 610 is not depicted with an object identifier and similarly, the first object 116 in the warped images 108 at the second position (e.g., at the end of the arrow 604) is not depicted with an object identifier.

As also depicted in FIG. 6, modified warped images 614 may be provided to the computer device 106 and/or the display screen 114. In particular, as depicted, the modified warped images 614 rendered at the display screen 114 include the warped images 108 modified to include the object identifier of "1" and a bounding box (e.g., similar to the bounding box 138) around the first object 116 at the first position that corresponds to the location 608-1, but not at the first object 116 at the second position that corresponds to the location 608-2.

FIG. 6 is next compared to FIG. 7 which indicates that the video analytics engine 102 has determined (e.g., at the block 308 of the method 300) that the second object 610 (e.g., of FIG. 4) meets one or more of the reidentification conditions 224. For example, based on the trajectory represented by the arrow 606, the video analytics engine 102 may determine and/or predict that the first object 116 will reappear at the location 608-2, and/or will have the trajectory represented by the arrow 612. Hence, as the second object 610, in FIG. 6, has appeared at the location 608-2, and/or has the trajectory represented by the arrow 612, the video analytics engine 102 reidentifies, in FIG. 7, (e.g., at the block 310 of the method 300) the second object 610 as the first object 116 at the dewarped images 118. As such comparing FIG. 7 with FIG. 6, the second object 610, of FIG. 6, has been identified, in FIG. 7, as the first object 116. Similarly, as depicted, the first object 116 at the location 608-2 is labelled with the same object identifier "1" as the first object 116 at the first location 608-1, and, similarly, in the warped images 108, the first object 116 in the warped images 108 at the second position at the opposite side of the center region 140 is also labelled with the same object identifier of "1".

Similarly, the modified warped images 614 rendered at the display screen 114 include the warped images 108 modified to include the object identifier of "1" and a bounding box (e.g., similar to the bounding box 138) around the first object 116 at the first position that corresponds to the location 608-1 and at the second position that corresponds to the location 608-2.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., convert warped images to dewarped images, and detect, identify and/or track objects in warped images from a fisheye camera as described herein, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    converting, at a video analytics engine, warped images from a fisheye camera into dewarped images by unfolding the warped images from opposite sides of a line applied to the warped images that extends from a center of the warped images to an edge of the warped images, the dewarped images comprising a first edge region and a second edge region corresponding to the opposite sides, the dewarped images comprising a blind-spot region corresponding to a center region of the warped images where objects are distorted, preventing the video analytics engine from identifying and tracking the objects;
    identifying objects in the dewarped images using bounding boxes;
    determining, at the video analytics engine, that a first moving object identified in the dewarped images is: located at the first edge region of the dewarped images;
    determining, at the video analytics engine, that a second moving object is: located at the second edge region of the dewarped images, the second edge region opposite the first edge region;
    in response to the second moving object meeting one or more reidentification conditions associated with the first moving object, reidentifying, at the video analytics engine, the second moving object as the first moving object in the dewarped images;
    continuing to convert, at the video analytics engine, the warped images from the fisheye camera into further dewarped images that comprise the first edge region, the second edge region and the blind-spot region;
    identifying further objects in the further dewarped images using further bounding boxes;
    determining, at the video analytics engine, that a further first moving object identified in the further dewarped images is: entering the blind-spot region of the further dewarped images;
    determining, at the video analytics engine, that a further second moving object is exiting the blind-spot region of the further dewarped images; and
    in response to the further second moving object meeting one or more of the reidentification conditions associated with the further first moving object, reidentifying, at the video analytics engine, the further second moving object as the further first moving object in the further dewarped images.

2. The method of claim 1, wherein the blind-spot region is located at a bottom of the dewarped images and the further dewarped images.

3. The method of claim 1, wherein the dewarped images and the further dewarped images comprise a panorama view of the warped images.

4. The method of claim 3, wherein the first edge region and the second edge region are at opposite sides of the panorama view of the warped images.

5. The method of claim 3, wherein the first edge region and the second edge region correspond to a same region of the warped images, or wherein the first edge region and the second edge region are within respective predefined distances from opposite sides of the panorama view of the warped images.

6. The method of claim 1, wherein a size of one or more of the first edge region and the second edge region depend on one or more of:
    a speed of the first moving object in the dewarped images;
    a video processing rate of the warped images; and
    a position of the first moving object in the dewarped images.

7. The method of claim 1, wherein the one or more reidentification conditions associated with the first moving object are based on one or more of:
    a respective trajectory of one or more of the first moving object and the second moving object;
    a respective velocity of one or more of the first moving object and the second moving object;
    and
    an appearance time of the second moving object relative to a disappearance time of the first moving object.

8. The method of claim 1, further comprising identifying an object in the warped images by:
    determining a first bounding box of the object in the dewarped images;
    converting coordinates of the first bounding box in the dewarped images to corresponding coordinates in the warped images; and, one or more of:
        drawing a second bounding box as a trapezoid in the warped images using the corresponding coordinates of the first bounding box, the second bounding box encompassing the object in the warped images; and
        drawing a third bounding box as a rectangle or a square in the warped images, as determined from the second bounding box, the third bounding box encompassing the object in the warped images.

9. The method of claim 1, further comprising: concurrently tracking the first moving object in the warped images and the dewarped images, the tracking including:
    labelling the first moving object in the warped images and the dewarped images;
    labelling the second moving object as the first moving object in the warped images and the dewarped images, such that one or more of a same label and a same object identifier is used for both the first moving object and the second moving object; and
    tracking the second moving object labelled as the first moving object in the warped images and the dewarped images.

10. A device comprising:
    a controller configured to:
        convert, at a video analytics engine, warped images from a fisheye camera into dewarped images by unfolding the warped images from opposite sides of a line applied to the warped images that extends from a center of the warped images to an edge of the warped images, the dewarped images comprising a first edge region and a second edge region corresponding to the opposite sides, the dewarped images comprising a blind-spot region corresponding to a center region of the warped images where objects are distorted, preventing the video analytics engine from identifying and tracking the objects;

identify the objects in the dewarped images using bounding boxes;

determine that a first moving object identified in the dewarped images is: located at the first edge region of the dewarped images;

determine that a second moving object is: located at the second edge region of the dewarped images, the second edge region opposite the first edge region; and in response to the second moving object meeting one or more reidentification conditions associated with the first moving object, reidentify the second moving object as the first moving object in the dewarped images;

continue to convert, at the video analytics engine, the warped images from the fisheye camera into further dewarped images that comprise the first edge region, the second edge region and the blind-spot region;

identifying further objects in the further dewarped images using further bounding boxes;

determine that a further first moving object identified in the further dewarped images is entering the blind-spot region of the further dewarped images;

determine that a further second moving object is: exiting the blind-spot region of the further dewarped images; and in response to the further second moving object meeting one or more of the reidentification conditions associated with the further first moving object, reidentify the further second moving object as the further first moving object in the further dewarped images.

11. The device of claim 10, wherein the blind-spot region is located at a bottom of the dewarped images and the further dewarped images.

12. The device of claim 10, wherein the dewarped images and the further dewarped images comprise a panorama view of the warped.

13. The device of claim 12, wherein the first edge region and the second edge region are at opposite sides of the panorama view of the warped images.

14. The device of claim 12, wherein the first edge region and the second edge region correspond to a same region of the warped images, or wherein the first edge region and the second edge region are within respective predefined distances from opposite sides of the panorama view of the warped images.

15. The device of claim 10, wherein a size of one or more of the first edge region and the second edge region depend on one or more of:
a speed of the first moving object in the dewarped images;
a video processing rate of the warped images; and
a position of the first moving object in the dewarped images.

16. The device of claim 10, wherein the one or more reidentification conditions associated with the first moving object are based on one or more of:
a respective trajectory of one or more of the first moving object and the second moving object;
a respective velocity of one or more of the first moving object and the second moving object; and
an appearance time of the second moving object relative to a disappearance time of the first moving object.

17. The device of claim 10, wherein the controller is further configured to identify an object in the warped images by:
determining a first bounding box of the object in the dewarped images;
converting coordinates of the first bounding box in the dewarped images to corresponding coordinates in the warped images; and, one or more of:
drawing a second bounding box as a trapezoid in the warped images using the corresponding coordinates of the first bounding box, the second bounding box encompassing the object in the warped images; and
drawing a third bounding box as a rectangle or a square in the warped images, as determined from the second bounding box, the third bounding box encompassing the object in the warped images.

18. The device of claim 10, wherein the controller is further configured to concurrently track the first moving object in the warped images and the dewarped images by:
labelling the first moving object in the warped images and the dewarped images;
labelling the second moving object as the first moving object in the warped images and the dewarped images, such that one or more of a same label and a same object identifier is used for both the first moving object and the second moving object; and
tracking the second moving object labelled as the first moving object in the warped images and the dewarped images.

* * * * *